April 22, 1952 L. DAVIS 2,593,734
PLUMBING TRAP AND THE LIKE
Filed April 25, 1947

INVENTOR
Lou Davis
by
Edward M. Fetherstonhaugh
ATTORNEY

Patented Apr. 22, 1952

2,593,734

UNITED STATES PATENT OFFICE 2,593,734

PLUMBING TRAP AND THE LIKE

Lou Davis, Moncton, New Brunswick, Canada

Application April 25, 1947, Serial No. 744,001
In Canada February 18, 1947

1 Claim. (Cl. 182—7)

The invention relates to improvements in plumbing traps and the like, as described in the present specification and illustrated in the accompanying drawings that form a part of the same.

The invention consists essentially of the novel features of construction as pointed out broadly and specifically in the claim for novelty following a description containing an explanation in detail of an acceptable form of the invention.

The objects of the invention are to provide a plumbing trap which may be easily removed for cleaning or inspection; to devise a plumbing trap which may be easily removed or placed in position; to construct a trap which may be used in plumbing installations, oil lines, hydraulic equipment and various fluid carrying lines; to provide a plumbing trap which does not require any tools for removing or replacing same; to devise a plumbing trap which can be easily cleaned by anyone, thus dispensing with the services of a plumber for this work; and generally to provide a plumbing trap which will be durable, dependable and efficient for its purpose.

In the drawings.

Like numerals of reference indicate corresponding parts in the various figures.

Figures 1, 2:
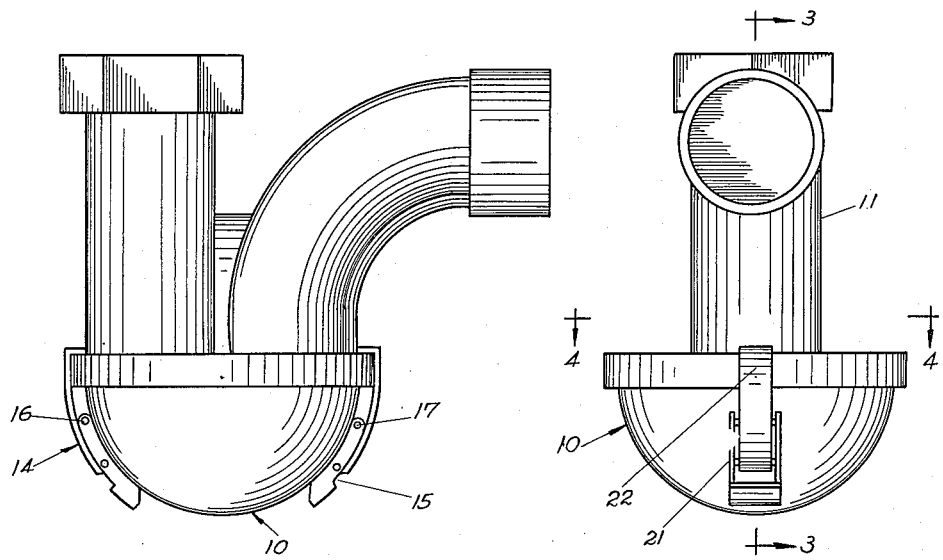
Figure 1 is a side view showing the trap in a closed position on a drain pipe.
Figure 2 is an end view of Figure 1.
Figures 3, 4:
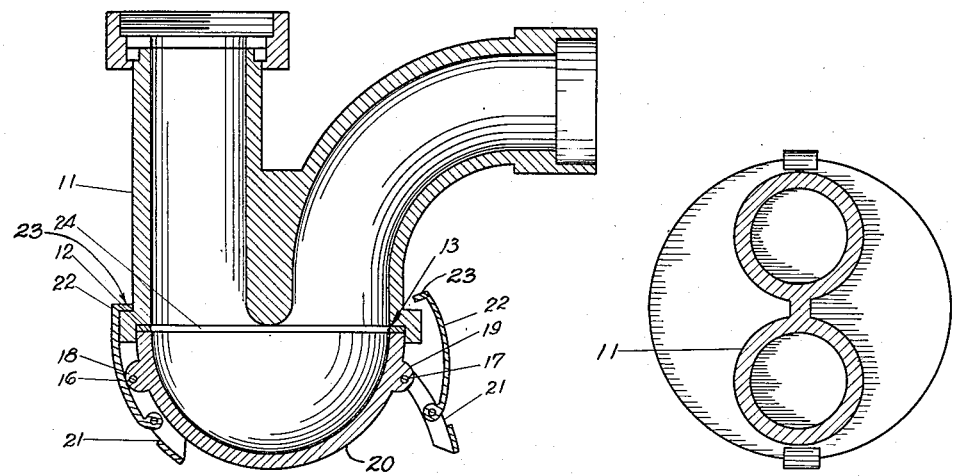
Figure 3 is a sectional view as taken on the line 3—3 in Figure 2 showing one of the clamps for same in a partially opened position.
Figure 4 is a sectional view as taken on the line 4—4 in Figure 2.

Referring to the drawings, the plumbing trap as indicated by the numeral 10 is adapted to be clamped on the under side of the drain pipe 11. The drain pipe 11 is of the conventional type with the exception that it has the flange or lip 12 around the opening 13.

The trap 10 is cup-shaped and has the clamps 14 and 15 pivotally secured to the outer surface thereof by means of the pins 16 and 17, respectively. These pins 16 and 17 are mounted in the lugs 18 and 19 which protrude outward from the body 20 of the trap and are integral therewith.

The clamps 14 and 15 each consists of the handle or lever 21 and the catch 22. Each of the levers 21 is pivotally connected to the trap body 20 and the catches 22, in turn, are pivotally connected to the central portion of the levers 21. The catches 22 each has a flange 23 on the free end thereof.

A gasket 24 is adapted to be seated within the flange 12 on the under side of the drain pipe 11 so that the upper edge of the trap 10 may bear on the same when in an assembled position.

In the use of the invention the trap 10 is placed in position on the under side of the drain pipe 11 and the catches 22 of the clamps 14 and 15 are hinged upward so that the flanges 23 of catches 22 of the same engage the upper surface of the flange 12. The levers 21 of these clamps 14 and 15 are then manually hinged downward and inward towards the body 20 of the trap 10. In this manner the flanges 23 of catches 22 of the clamps 14 and 15 positively grip the flange 12 thus securing the trap 10 in position on the underside of the drain pipe 11. In the removal of the trap 10 the clamps 14 and 15 are manipulated in a reverse manner to that hereinbefore described.

It will be seen from the foregoing that a plumbing trap has been provided that will facilitate the removal of sediment therefrom and the cleaning of the same.

What I claim is:

In a plumbing trap, a curved drain pipe being truncated leaving two disconnected conjugate pipe sections, angularly related and being integrally connected by a thickened wall portion, a circular flange integral with the drain pipe and encompassing the open ends of the pipe sections and a circular lip depending from said circular flange, a gasket seated within said circular flange, the combination of a trap with latching means incorporated therewith whereby it is detachably connectable to the pipe sections, said trap comprising a semi-spherical body portion, lugs integral with the said body portion on opposite sides thereof and extending outward therefrom, the latching means comprising a lever and catch mechanism located on opposite sides of said semi-spherical body portion, the levers being pivotally attached at their upper ends to said lugs to be moved outward and upward therefrom, the said catches being pivotally connected to said levers midway along the same and extending upward therefrom, the said catch comprising an inturned flange at its upper end, the upper edge of said semi-spherical body portion being seated against the said gasket within said circular flange and the latching mechanism being manually operable whereby the said levers upon being moved downward and inward against the said semi-spherical body portion draw said catches downward to position the flanges thereof on top of the said circular flange encompassing the said pipe sections to thus positively secure the trap to the drain pipe, the drawing out and upward of said levers effecting a loosening of said catches from the said circular flange whereby the trap may be removed from the drain pipe.

LOU DAVIS.

REFERENCES CITED

The following references are of record in the file of this patent:

UNITED STATES PATENTS

| Number | Name | Date |
|---|---|---|
| 245,011 | Nicholson | Aug. 2, 1881 |
| 395,907 | Kerr | Jan. 8, 1889 |
| 1,773,693 | Stirrup | Aug. 19, 1930 |
| 2,241,005 | Smith | May 6, 1941 |

FOREIGN PATENTS

| Number | Country | Date |
|---|---|---|
| 43,866 | Switzerland | July 14, 1908 |
| 559,173 | Great Britain | Feb. 8, 1944 |
| 602,347 | France | Dec. 22, 1925 |
| 823,482 | France | Oct. 18, 1937 |